(12) United States Patent
Hong et al.

(10) Patent No.: US 8,564,724 B2
(45) Date of Patent: Oct. 22, 2013

(54) GHOSTING ARTIFACT REDUCTION IN TEMPORAL NOISE FILTERING

(75) Inventors: Wei Hong, Richardson, TX (US); Harmeet Singh, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 675 days.

(21) Appl. No.: 12/753,897

(22) Filed: Apr. 4, 2010

(65) Prior Publication Data
US 2011/0242422 A1 Oct. 6, 2011

(51) Int. Cl.
*H04N 5/00* (2011.01)

(52) U.S. Cl.
USPC ............. 348/614; 348/607; 348/701; 348/94; 348/447; 348/597; 348/497; 348/668; 348/669; 348/627; 375/346; 375/347; 375/348; 375/349; 375/350; 375/351; 382/275

(58) Field of Classification Search
USPC ......... 348/614, 701, 607, 597, 668, 669, 627, 348/94, 447, 497; 382/275; 375/346–351
See application file for complete search history.

(56) References Cited

U.S. PATENT DOCUMENTS

| | | | | |
|---|---|---|---|---|
| 5,983,251 A * | 11/1999 | Martens et al. | | 708/203 |
| 7,538,822 B2 * | 5/2009 | Lee et al. | | 348/606 |
| 7,729,555 B2 * | 6/2010 | Chen et al. | | 382/261 |
| 2006/0158562 A1 * | 7/2006 | Rhee | | 348/607 |
| 2009/0153739 A1 | 6/2009 | Hong | | |
| 2009/0273716 A1 | 11/2009 | Wu | | |
| 2011/0051005 A1 * | 3/2011 | Wu et al. | | 348/607 |

OTHER PUBLICATIONS

Harris, et al. "Minimizing the Ghosting Artifact in Scene-Based Nonuniformity Correction," Proc. SPIE. vol. 3377, pp. 106-113. Infrared imaging systems: Design, Analysis, Modeling and Testing IX, 1998.
Harris, et al. "Nonuniformity Correction of Infrared Image Sequences Using the Constant-Statistics Constraint," IEEE Transactions on Image Processing, vol. 8, No. 8, Aug. 1999.
Huang et al. "A Multistage Motion Vector Processing Method for Motion-Compensated Frame Interpolation," IEEE Transactions on Image Processing, vol. 17, No. 5, May 2008.

* cited by examiner

*Primary Examiner* — Jefferey Harold
*Assistant Examiner* — Mustafizur Rahman
(74) *Attorney, Agent, or Firm* — Mirna Abyad; W. James Brady; Frederick J. Telecky, Jr.

(57) ABSTRACT

A method of noise filtering of a digital video sequence to reduce ghosting artifacts, the method including computing motion values for pixels in a frame of the digital video sequence based on a reference frame, computing blending factors for the pixels based on the motion values, generating filtered output pixel values by applying the blending factors to corresponding pixel values in the reference frame and the frame, wherein selected filtered output pixel values are converged toward corresponding pixel values in the frame to reduce ghosting artifacts, and outputting the filtered frame.

17 Claims, 6 Drawing Sheets

GHOSTING ARTIFACT REDUCTION IN TEMPORAL NOISE FILTERING

CROSS-REFERENCE TO RELATED APPLICATIONS

This application is related to United States Patent Application Publication No. 2009/0153739, filed Dec. 12, 2008, which is incorporated herein by reference.

BACKGROUND OF THE INVENTION

Video noise filters have become important differentiators for consumer video products because noise level is one of the key factors of video quality. Videos captured by imaging sensors (e.g., cell phone cameras, video cameras) or received from analog video inputs (e.g., TV cable, DVD/VCR) are often contaminated by significant amounts of random noise. Video noise filters can improve visual quality, coding efficiency, and facilitate further processing and analysis such as enhancement, object tracking, and recognition. Further, video noise filters can be applied in many applications such as cell phone camera, video surveillance, and DVR, etc.

In many applications, a video noise filter includes both a spatial noise filter (SNF) and a temporal noise filter (TNF). In general, temporal noise filtering is more effective than spatial noise filtering for video noise filtering because temporal noise filtering utilizes information from multiple frames. One of the more commonly used TNFs is a temporal infinite impulse response (IIR) filter which has very low computational complexity and utilizes information from all previous frames. However, use of a temporal IIR noise filter on a video sequence may result in ghosting artifacts leading to sticky contours in moving areas of the video sequence, especially at high filter strengths. A sticky contour occurs if an object in a video sequence is moving and the contours, i.e., edges, of the object in a former position remain visible when the object has moved. For example, if a box is moving from left to right, the sticky contours may be visible as a lot of vertical lines to the left of the moving box. These visible contours may be referred to as ghosting artifacts. A motion adaptive temporal IIR noise filter can reduce the ghosting artifacts by automatically adjusting filter strength according to the motion amplitude of the video sequence. However, even with such automatic adjustment, some ghosting artifacts do not fade away with time. Accordingly, improvements in temporal noise filtering are desirable.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
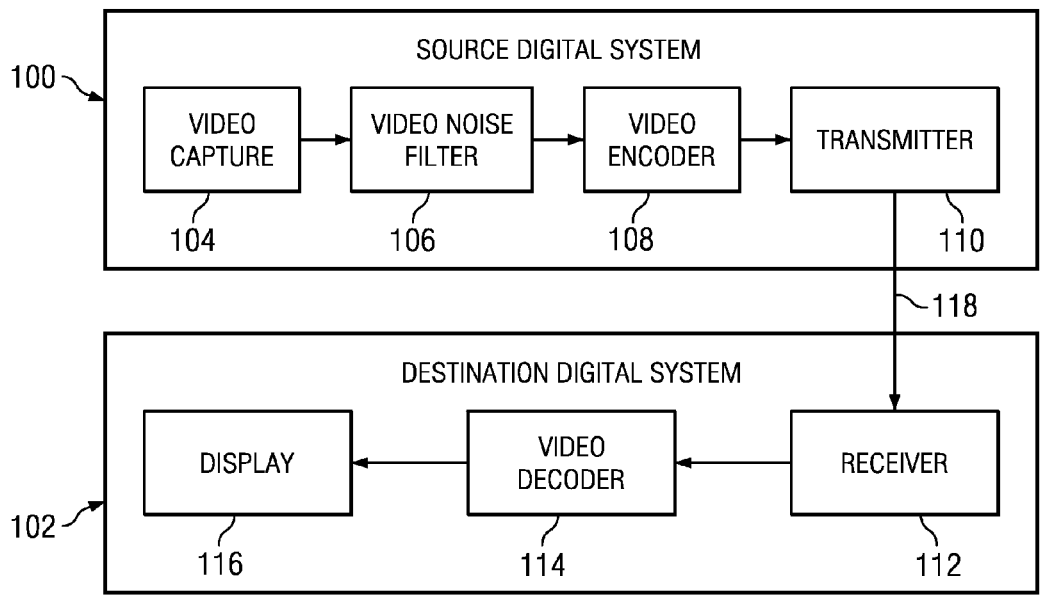
FIG. 1 shows a block diagram of a digital system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless connection. Thus, if a first device or component couples to a second device or component, that connection may be through a direct connection, through an indirect connection via other devices and connections, through an optical connection, and/or through a wireless connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, combined, and/or performed in a different order than the order shown in the figures and/or described herein. Accordingly, embodiments of the invention should not be considered limited to the specific ordering of steps shown in the figures and/or described herein.

In general, embodiments of the invention provide methods and systems for ghosting artifact reduction in temporal noise filtration of a digital video sequence. More specifically, embodiments of the invention reduce ghosting artifacts that may be introduced by the application of a motion adaptive temporal infinite impulse response (IIR) noise filter to frames of a video sequence. For example, in a motion adaptive temporal IIR filter, the output frame $[Y_o(x,y,n), U_o(x,y,n), V_o(x,y,n)]$ is the weighted average of the input frame $[Y_o(x,y,n), U_o(x,y,n), V_c(x,y,n)]$ and the previous output frame of the filter, i.e., a reference frame, $[Y_o(x,y,n-1), U_o(x,y,n-1), V_o(x,y,n-1)]$:

$$Y_o(x,y,n)=a(x,y,n)Y_c(x,y,n)+(1-a(x,y,n))Y_o(x,y,n-1)$$

$$U_o(x,y,n)=a(x,y,n)U_c(x,y,n)+(1-a(x,y,n))U_o(x,y,n-1)$$

$$V_o(x,y,n)=a(x,y,n)V_c(x,y,n)+(1-a(x,y,n))V_o(x,y,n-1)$$

where x and y are the spatial coordinates, n is the temporal coordinate, i.e., the frame index, Y, U, V are the three color channels of the video sequence, and $a(x,y,n)$ is a blending factor controlled by the motion value $m(x,y,n)$.

The motion value $m(x,y,n)$ for a pixel is the L1 distance, i.e., sum of absolute differences, between the current input frame and the reference frame for all three color channels:

$$m(x,y,n)=|Y_c(x,y,n)-Y_o(x,y,n-1)|+|U_c(x,y,n)-U_o(x,y,n-1)|+|V_c(x,y,n)-V_o(x,y,n-1)|$$

If the motion value is small, indicating that the pixel is aligned well at this position, a strong temporal filter is applied. If the motion value is large, indicating that the pixel is not aligned well at this position, a weak temporal filter is applied. Thus, the blending factor a for each pixel at x, y is a function of motion m at that pixel location:

$$a(x, y, n) = a_0 + (1 - a_0)m(x, y, n)/T_m \quad \text{if } m(x, y, n) < T_m$$
$$= 1 \quad \text{else}$$

where $T_m$ and $a_0$, are input parameters of the temporal filter. These parameters are explained in more detail below. Larger values of $T_m$ may cause ghosting artifacts.

Ideally, the output pixel value $[Y_o(x,y,n), U_o(x,y,n), V_o(x,y,n)]$ is always approaching the current input value $[Y_c(x,y,n), U_c(x,y,n), V_c(x,y,n)]$. However, in common fix-point implementations, the input and output pixel values are integers. In such cases, a numerical problem may happen as follows. Consider the Y channel. If all pixel values are integers, the Y channel of the output frame is a rounded value of the weighted average:

$$Y_o(x, y, n) = \text{round}(a(x, y, n)Y_c(x, y, n) + (1 - a(x, y, n))Y_o(x, y, n - 1))$$
$$= \text{round}(Y_o(x, y, n - 1) + a(x, y, n)(Y_c(x, y, n) - Y_o(x, y, n - 1)))$$
$$= Y_o(x, y, n - 1) + \text{round}(a(x, y, n)(Y_c(x, y, n) - Y_o(x, y, n - 1)))$$

If $|Y_c(x,y,n) - Y_o(x,y,n-1)|$ is small and $a(x,y,n)$ is also small, $|a(x,y,n)(Y_c(x,y,n) - Y_o(x,y,n-1))|$ could be less than ½. In such cases, the output pixel value $Y_o(x,y,n)$ is equal to the previous output pixel value $Y_o(x,y,n-1)$. If ghosting artifacts occur in these pixel locations, the artifacts will remain as long as the condition continues to be met. Visually, sticky contours in moving areas of the video sequence will be observed. The same conclusion applies to U and V channels.

In one or more embodiments of the invention, selected blending factors are modified to compensate for this condition and accordingly reduce the occurrence of ghosting artifacts. In some embodiments of the invention, post-processing is performed after the weighted average is performed to compensate for this condition and accordingly reduce the occurrence of ghosting artifacts.

FIG. 1 shows a block diagram of a digital system in accordance with one or more embodiments of the invention. The digital system is configured to perform temporal noise filtering on digital video sequences. The system includes a source digital system (200) that transmits encoded video sequences to a destination digital system (202) via a communication channel (218). The source digital system (200) includes a video capture component (204), a video noise filter component (206), a video encoder component (208) and a transmitter component (210). The video capture component (204) is configured to provide a video sequence to be filtered by the video noise filter component (206) prior to encoding by the video encoder component (208). The video capture component (204) may be for example, an imaging sensor, a video camera, a video archive, or a video feed from a video content provider. In some embodiments of the invention, the video capture component (204) may generate computer graphics as the video sequence, or a combination of live video and computer-generated video.

The video noise filter component (206) receives a video sequence from the video capture component and performs noise filtering that includes an embodiment of a method of temporal noise filtering with ghosting artifact reduction as described herein on the frames of the video sequence to generate a noise filtered video sequence. In some embodiments of the invention, the video noise filter component (206) may include functionality/components as described in reference to FIG. 2A below.

The video encoder component (208) receives a noise filtered video sequence from the video noise filter component (206) and encodes it for transmission by the transmitter component (210). In general, the video encoder component (208) receives the noise filtered video sequence from the video capture component (204) via the video noise filter component (206) as a sequence of frames, divides the frames into coding units which may be a whole frame or a part of a frame, divides the coding units into blocks of pixels, and encodes the video data in the coding units based on these blocks.

The transmitter component (210) transmits the encoded video data to the destination digital system (202) via the communication channel (218). The communication channel (218) may be any communication medium, or combination of communication media suitable for transmission of the encoded video sequence, such as, for example, wired or wireless communication media, a local area network, or a wide area network.

The destination digital system (202) includes a receiver component (212), a video decoder component (214) and a display component (216). The receiver component (212) receives the encoded video data from the source digital system (200) via the communication channel (218) and provides the encoded video data to the video decoder component (214) for decoding. In general, the video decoder component (214) reverses the encoding process performed by the video encoder component (208) to reconstruct the frames of the video sequence. The reconstructed video sequence may then be displayed on the display component (216). The display component (216) may be any suitable display device such as, for example, a plasma display, a liquid crystal display (LCD), a light emitting diode (LED) display, etc.

In some embodiments of the invention, the source digital system (200) may also include a receiver component and a video decoder component and/or the destination digital system (202) may include a transmitter component and a video encoder component for transmission of video sequences in both directions for video streaming, video broadcasting, and video telephony. Further, the video encoder component (208) and the video decoder component (214) may perform encoding and decoding in accordance with one or more video compression standards such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), etc. The video noise filter component (206), the video encoder component (208) and the video decoder component (214) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 2A:
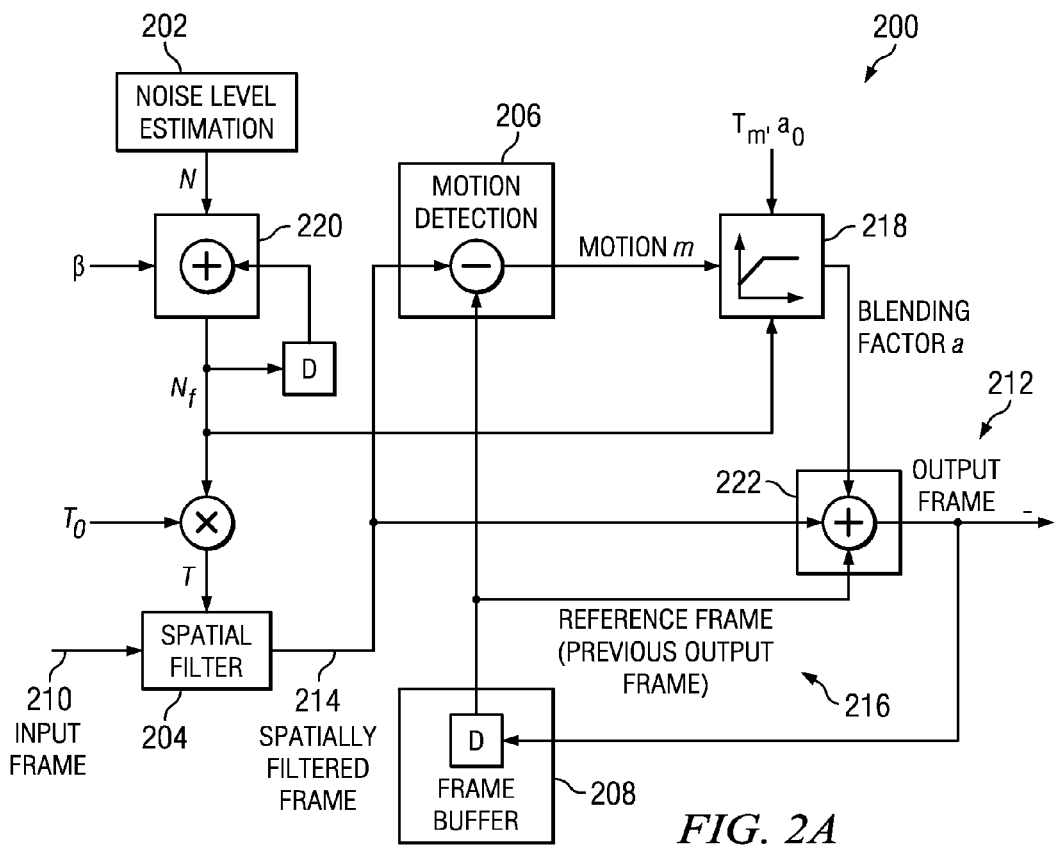
FIG. 2A shows a block diagram of a noise filter that includes a temporal noise filter in accordance with one or more embodiments of the invention.

FIG. 2A shows a block diagram of a noise filter (200), e.g., the video noise filter component (106) of FIG. 1, in accordance with one or more embodiments of the invention. The noise filter (200) is configured to perform both spatial filtration and temporal filtration on frames on a video sequence. The pixel values in the input frames and the filtered output frames are integer values. The temporal filtration is provided by a motion-adaptive temporal IIR filter that includes performing ghosting artifact reduction as described herein. Further, temporal filtration is applied after spatial filtration is performed. As shown in FIG. 2, the noise filter (200) includes a noise level estimation component (202), an IIR filter component (220), a spatial filter component (204), and components for temporal filtration, i.e., a motion detection component (206), a motion-to-blending factor conversion component (218), a frame blending component (222), and a frame buffer (208).

Further, $T_0$, β, $T_m$ and $a_0$ are input parameters of the noise filter (200). $T_0$ is a parameter of the spatial filter component (204) that controls the strength of the spatial noise filter. A larger $T_0$ value produces smoother results while a smaller value retains more detail. 3 is a parameter of the IIR filter (220) that controls how fast the noise level changes from frame-to-frame. $T_m$ and $a_0$ are input parameters for temporal filtration. The value of $T_m$ is a motion threshold and is used to control the strength of the temporal noise filter. Flat areas in frames, i.e., areas without texture, look smoother for increasing values of $T_m$ but larger values of $T_m$ may cause more ghosting artifacts on moving areas. The value of $a_0$ is also used to control the strength of the temporal noise filter. The value may range between 0 and 1 where the filter is stronger when $a_0$ is close to 0 and weaker when $a_0$ is close to 1.

The noise level estimation component (202) estimates the level of noise in the input frame. The noise estimation is performed for each color channel, i.e., Y, U, V, of the input frame and may be performed on the input frame block-by-block or line-by-line. Noise level estimation may be performed using any suitable noise estimation technique. Some suitable techniques are described in U.S. Patent Application Publication No. 2009/0153739.

The IIR filter component (220) applies a low-pass IIR filter to the output of the noise level estimation component (202) to control the speed of change in noise level by generating a filtered noise level. The low-pass IIR filter is applied to the noise level for each color channel. The filtered noise level is then provided as an input to the motion-to-blending factor conversion component (218). Further, the filtered noise level is scaled using $T_o$ to generate an input strength parameter for the spatial filter component (204).

The spatial filter component (204) performs spatial filtration on each color channel, i.e., Y, U, V, of the input frame (210) to generate a spatially filtered frame (214). Further, the spatial filtration may be applied block-by-block or line-by-line. The spatial filtered frame is provided as an input to the motion detection component (206), and the frame blending component (222). Spatial filtration may be performed according to any suitable spatial filtration technique. One suitable spatial filtration technique is described in U.S. Patent Application Publication No. 2009/0153739.

The frame buffer (208) stores the previous output frames of the noise filter (100). These output frames are used as reference frames by the motion detection component (206) and the frame blending component (222).

The motion detection component (206) computes the motion between the reference frame from the frame buffer (208) and the spatially filtered frame (214). A motion value $m(x,y,n)$ for each pixel is computed based on the three color channels as the sum of the absolute differences between corresponding pixels in the two frames:

$$m(x,y,n)=|Y_c(x,y,n)-Y_o(x,y,n-1)|+|U_c(x,y,n)-U_o(x,y,n-1)|+|V_c(x,y,n)-V_o(x,y,n-1)|$$

where $[Y_o(x,y,n-1), U_o(x,y,n-1), V_o(x,y,n-1)]$ is the reference frame and $[Y_c(x,y,n), U_c(x,y,n), V_c(x,y,n)]$ is the spatially filtered frame (214).

The motion-to-blending factor conversion component (218) computes a blending factor $a(x,y,n)$ for each pixel using the filtered noise estimate from the noise level estimation component (202) and the motion value from the motion detection component (206). More specifically, a blending factor for a pixel is computed as a function of $a_0$, $T_m$, and the motion value for that pixel. As was previously explained, $a_0$ is an input parameter to the temporal noise filter that controls the strength of the filter. If the motion is large, the value of this parameter is set closer to 0 to increase the strength of the filter; if the motion is large, the value of the parameter is set closer to 1 to decrease the strength of the filter. In some embodiments of the invention, the value of this parameter is set by a user. In some embodiments of the invention, the value of this parameter is determined by the noise levels computed for the three color channels by the noise level estimation component (202). Setting the value of this parameter based on estimated noise level is described in U.S. Patent Application Publication No. 2009/0153739. Computing the blending factor $a(x,y,n)$ in various embodiments of the invention is described in more detail below.

The frame blending component (222) generates the filtered output frame (212) using the blending factor $a(x,y,n)$ computed by the motion-to-blending factor conversion component (218), the reference frame from the frame buffer (208), and the spatially filtered frame (214). More specifically, the pixel values of the output frame $[Y_o(x,y,n), U_o(x,y,n), V_o(x,y,n)]$ (212) in three color channels are computed as the weighted average of the pixels in the reference frame $[Y_o(x,y,n-1), U_o(x,y,n-1), V_o(x,y,n-1)]$ and the spatially filtered frame $[Y_c(x,y,n), U_c(x,y,n), V_c(x,y,n)]$:

$$Y_o(x,y,n)=\text{round}(a(x,y,n)Y_c(x,y,n)+(1-a(x,y,n))Y_o(x,y,n-1))$$

$$U_o(x,y,n)=\text{round}(a(x,y,n)U_c(x,y,n)+(1-a(x,y,n))U_o(x,y,n-1))$$

$$V_o(x,y,n)=\text{round}(a(x,y,n)V_c(x,y,n)+(1-a(x,y,n))V_o(x,y,n-1))$$

In one or more embodiments of the invention, the motion-to-blending factor conversion component (218) computes the blending factor for each pixel as $$a(x, y, n) = a_0 + (1 - a_0)m(x, y, n)/T_m \quad \text{if } m(x, y, n) < T_m$$
$$= 1 \quad \text{else.}$$

Figure 2B:
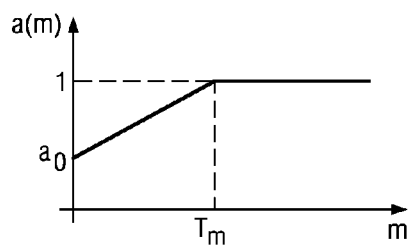
FIG. 2B-2D show motion-to-blending factor functions in accordance with one or more embodiments of the invention.

As is illustrated in FIG. 2B, the blending factor a for a pixel at location x,y is a function of the motion m at that pixel location. The motion-to-blending factor function a(m) may be implemented as a lookup table that is updated for each frame, thus requiring no additional computation for each pixel. Pseudo code illustrating creation of the lookup table a(m) for a frame is shown in Table 1. In the pseudo code, MAX_m is the maximum motion value. In embodiments of the invention in which the blending factor is computed as shown above, the frame blending component (222) may perform post-processing on the filtered output frame (212) to reduce ghosting artifacts.

TABLE 1

```
for m = 0 to MAX_m
    if (m < T_m)
        a[m] = a_0+(1- a_0)m / T_m
    else
        a[m] = 1
    end if
end for
```

In some embodiments of the invention, the post-processing is a step-wise convergence on the output pixel values in the three color channels to move the output pixels values toward the input pixel values by 1 if the output pixel value is equal to the corresponding previous output pixel value, i.e., the corresponding reference pixel value. Table 2 shows pseudo code illustrating the step-wise convergence:

TABLE 2

```
if (Y_c(x,y,n) > Y_o(x,y,n)) and (Y_o(x,y,n) = Y_o(x,y,n-1))
    Y_o(x,y,n) ++;
if (Y_c(x,y,n) < Y_o(x,y,n)) and (Y_o(x,y,n) = Y_o(x,y,n-1))
    Y_o(x,y,n) --;
if (U_c(x,y,n) > U_o(x,y,n)) and (U_o(x,y,n) = U_o(x,y,n-1))
    U_o(x,y,n) ++;
if (U_c(x,y,n) < U_o(x,y,n)) and (U_o(x,y,n) = U_o(x,y,n-1))
    U_o(x,y,n) --;
if (V_c(x,y,n) > V_o(x,y,n)) and (V_o(x,y,n) = V_o(x,y,n-1))
    V_o(x,y,n) ++;
if (V_c(x,y,n) < V_o(x,y,n)) and (V_o(x,y,n) = V_o(x,y,n-1))
    V_o(x,y,n) --;
```

In some embodiments of the invention, the post-processing is an instant convergence of the output pixel values in the three color channels that forces the output pixel value to be the same as the input pixel value if the output pixel value is equal to the corresponding previous output pixel value, i.e., the corresponding reference pixel value. Table 3 shows pseudo code illustrating the convergence:

TABLE 3

```
if (Y_o(x,y,n) = Y_o(x,y,n-1))
    Y_o(x,y,n) = Y_c(x,y,n);
if (U_o(x,y,n) = U_o(x,y,n-1))
    U_o(x,y,n) = U_c(x,y,n);
if (V_o(x,y,n) = V_o(x,y,n-1))
    V_o(x,y,n) = V_c(x,y,n);
```

In one or more embodiments of the invention, to reduce ghosting artifacts, the motion-to-blending factor conversion component (218) uses a modification of the blending function of FIG. 2B to compute blending factors that reduce the possibility of generating output pixel values that may result in sticky contours. As previously mentioned, the sticky contour problem occurs when $|a(x,y,n)(Y_c(x,y,n)-Y_o(x,y,n-1))|<\frac{1}{2}$ in the Y channel, and similarly for the other channels.

In some embodiments of the invention, the blending function is modified to cause a step-wise convergence of the output pixel value to the input pixel value when the condition $|a(x,y,n)(Y_c(x,y,n)-Y_o(x,y,n-1))|<\frac{1}{2}$ (or a similar condition in the other color channels) could occur. The goal of the modification is to compute blending factors when the condition could occur such that the resulting output pixel value is moved toward the input pixel value by 1, i.e., round (a(x,y,n) m(x,y,n))=1 or a(x,y,n)m(x,y,n)=½. Since $a(x,y,n)=a_0+(1-a_0) m(x,y,n)/T_m$ and $|Y_c(x,y,n)-Y_o(x,y,n-1)| \approx m(x,y,n)/3$, the above condition can be approximated as:

$$|a(x,y,n)(Y_c(x,y,n)-Y_o(x,y,n-1))|=(a_0+(1-a_0)m(x,y,n)/T_m)m(x,y,n)/3<\frac{1}{2}$$

Figure 2C:
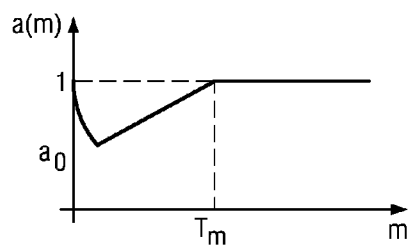

Pseudo code illustrating creation of the lookup table a(m) for a frame that includes blending factors that will cause the step-wise convergence is shown in Table 4. An example of the modified motion-to-blending factor function is shown in FIG. 2C.

TABLE 4

```
for m = 0 to MAX_m
    if (m>=T_m or m = 0)
        a[m] = 1
    else if (2 (a_0 + (1- a_0) m / T_m) m >= 3)
        a[m] = a_0+(1- a_0)m / T_m
    else
        a[m] = 3/(2*m)
    end if
end for
```

Figure 2D:
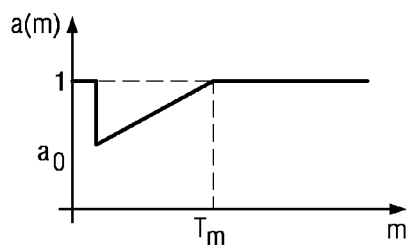

In some embodiments of the invention, the blending function is modified to cause an instant convergence of the output pixel value to the input pixel value. The goal of the modification is that the blending factor is computed such that the resulting output pixel value the same as the input pixel value when the condition $|a(x,y,n)(Y_c(x,y,n)-Y_o(x,y,n-1))|<\frac{1}{2}$ could occur. Pseudo code illustrating creation of the lookup table a(m) for a frame that includes blending factors that will cause the instant convergence is shown in Table 5. An example of the modified motion-to-blending factor function is shown in FIG. 2D.

TABLE 5

```
for m = 0 to MAX_m
    if (2 (a_0 + (1- a_0) m / T_m) m >= 3) and (m < T_m)
        a[m] = a_0+(1- a_0)m / T_m
    else
        a[m] = 1
    end if
end for
```

Each of the above approaches for reducing ghosting artifacts have a similar result: a small amount of noise will be left after application of the temporal noise filter. The two approaches using step-wise convergence remove the ghosting slowly but leave less noise. The two approaches using instant convergence remove the ghosting quickly but leave more noise. In some embodiments of the invention, all four approaches or some combination thereof may be implemented in the noise filter (100) such that a user may select which is to be applied.

Figure 3:
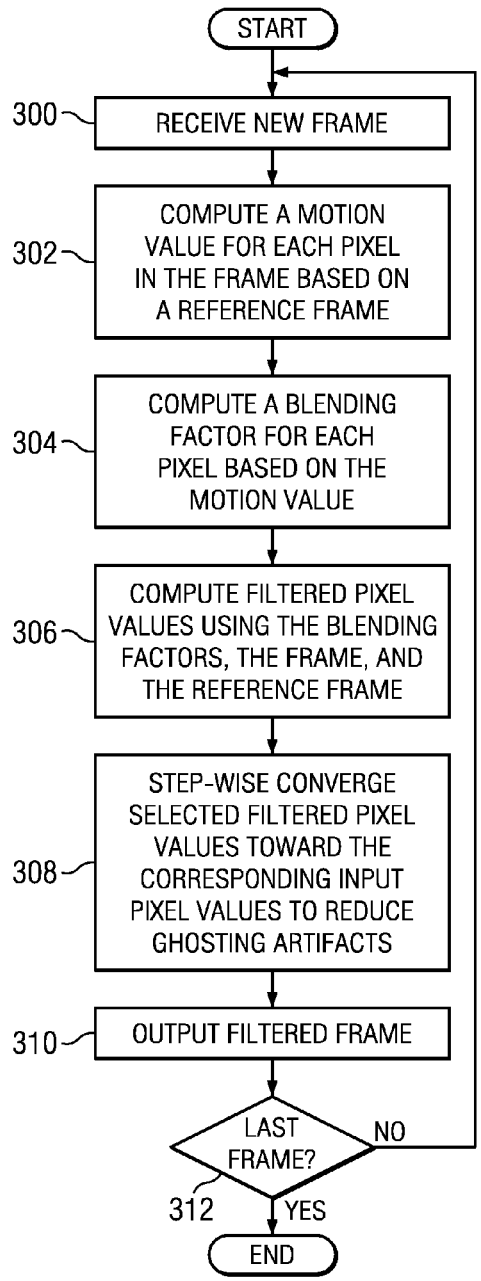
FIGS. 3-6 show flow graphs of methods in accordance with one or more embodiments of the invention.

FIG. 3 is a flow graph of a method for ghosting artifact reduction in a temporal noise filter in accordance with one or more embodiments of the invention. As shown in FIG. 3, the method is applied to frames in a video sequence. Initially, a frame is received (300). In one or more embodiments of the invention, a spatial filter is applied to the original frame of the video sequence such that the frame received is a spatially filtered frame. Any suitable spatial filter may be used. In some embodiments of the invention, the received frame is the original frame.

A motion value is computed for each pixel in the frame based on a reference frame (302). In one or more embodiments of the invention, the reference frame is a previous filtered frame produced by application of the method to the frame immediately preceding the frame being processed in the video sequence. In some embodiments of the invention, a motion value m(x,y,n) for each pixel is computed based on the three color channels as the sum of the absolute differences between corresponding pixels in the two frames:

$$m(x,y,n)=|Y_o(x,y,n)-Y_o(x,y,n-1)|+"U_o(x,y,n)-U_o(x,y,n-1)|+|V_o(x,y,n)-V_o(x,y,n-1)|$$

where $[Y_o(x,y,n-1), U_o(x,y,n-1), V_o(x,y,n-1)]$ is the reference frame and $[Y_c(x,y,n), U_c(x,y,n), V_c(x,y,n)]$ is current frame.

A blending factor is then computed for each pixel based on the motion value computed for the pixel (304). The blending factor for a pixel is computed as a function of $a_0$, $T_m$, and the motion value for that pixel. In one or more embodiments of the invention, the blending factor for each pixel is computed as $$a(x, y, n) = a_0 + (1 - a_0)m(x, y, n)/T_m \quad \text{if } m(x, y, n) < T_m$$
$$= 1 \quad \text{else.}$$

In some embodiments of the invention, computation of the blending factor is a table lookup using the motion value as an index. Pseudo code illustrating creation of such a table is shown in Table 1.

Filtered pixel values are then computed using the blending factors, the frame, and the reference frame (308). More specifically, the pixel values of the output frame $[Y_o(x,y,n), U_o(x,y,n), V_o(x,y,n)]$ are computed as the weighted average of the pixels in the reference frame $[Y_o(x,y,n-1), U_o(x,y,n-1), V_o(x,y,n-1)]$ and corresponding pixels in the current frame $[Y_c(x,y,n), U_c(x,y,n), V_c(x,y,n)]$:

$$Y_o(x,y,n)=\text{round}(a(x,y,n)Y_c(x,y,n)+(1-a(x,y,n))Y_o(x,y,n-1))$$

$$U_o(x,y,n)=\text{round}(a(x,y,n)U_c(x,y,n)+(1-a(x,y,n))U_o(x,y,n-1))$$

$$V_o(x,y,n)=\text{round}(a(x,y,n)V_c(x,y,n)+(1-a(x,y,n))V_o(x,y,n-1)).$$

Selected filtered pixel values in the output frame are then step-wise converged toward corresponding pixel values in the current frame to reduce ghosting artifacts (308). More specifically, if a filtered pixel value $Y_o(x,y,n)$, $U_o(x,y,n)$, $V_o(x,y,n)$ is equal to the corresponding pixel value in the reference frame $Y_o(x,y,n-1)$, $U_o(x,y,n-1)$, $V_o(x,y,n-1)$, the filtered pixel value $Y_o(x,y,n)$, $U_o(x,y,n)$, $V_o(x,y,n)$ is incremented or decremented by one (1) as appropriate to move the filtered pixel value $Y_o(x,y,n)$, $U_o(x,y,n)$, $V_o(x,y,n)$ toward the corresponding pixel value of the current frame $Y_c(x,y,n)$, $U_c(x,y,n)$, $V_c(x,y,n)$. Table 2 shows pseudo code illustrating the step-wise convergence.

The resulting filtered frame is then output (310). If the last frame in the video sequence has been processed (312), the method ends. Otherwise, next frame is processed.

Figure 4:
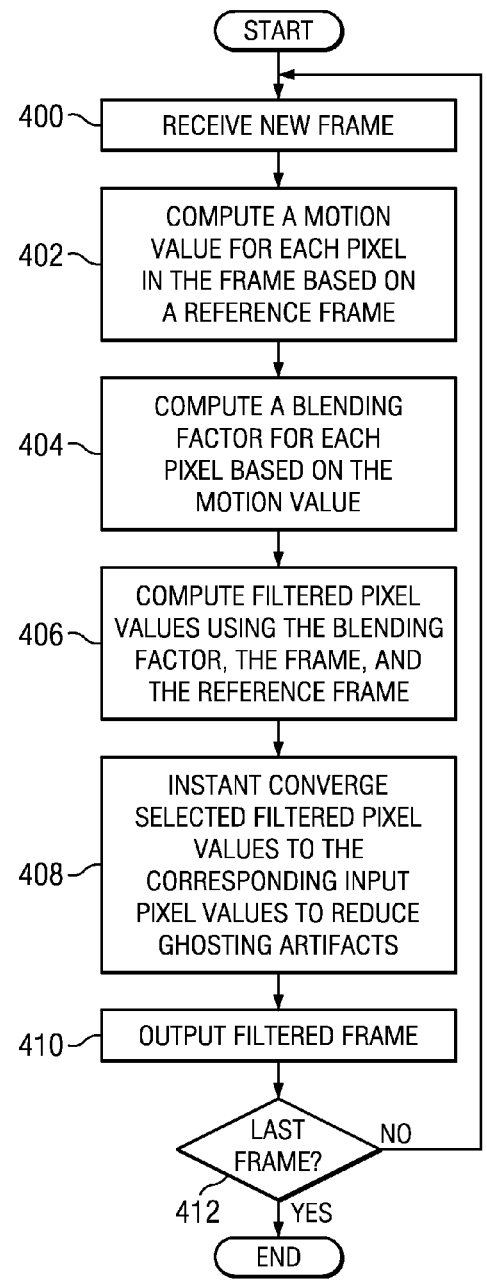

FIG. 4 is a flow graph of a method for ghosting artifact reduction in a temporal noise filter in accordance with one or more embodiments of the invention. As shown in FIG. 4, the method is applied to frames in a video sequence. Steps 400-406 are the same as steps 300-306 of FIG. 3. Once the filtered pixel values of the output frame are computed (400-406), selected filtered pixel values in the output frame are instantly converged to the corresponding pixel values in the current frame to reduce ghosting artifacts (408). More specifically, if a filtered pixel value $Y_o(x,y,n)$, $U_o(x,y,n)$, $V_o(x,y,n)$ is equal to the corresponding pixel value in the reference frame $Y_o(x,y,n-1)$, $U_o(x,y,n-1)$, $V_o(x,y,n-1)$, the filtered pixel value $Y_o(x,y,n)$, $U_o(x,y,n)$, $V_o(x,y,n)$ is replaced in the output frame by the corresponding pixel value of the current frame $Y_c(x,y,n)$, $U_c(x,y,n)$, $V_c(x,y,n)$. Table 3 shows pseudo code illustrating the instant convergence. The resulting filtered frame is then output (410). If the last frame in the video sequence has been processed (412), the method ends. Otherwise, next frame is processed.

Figure 5:
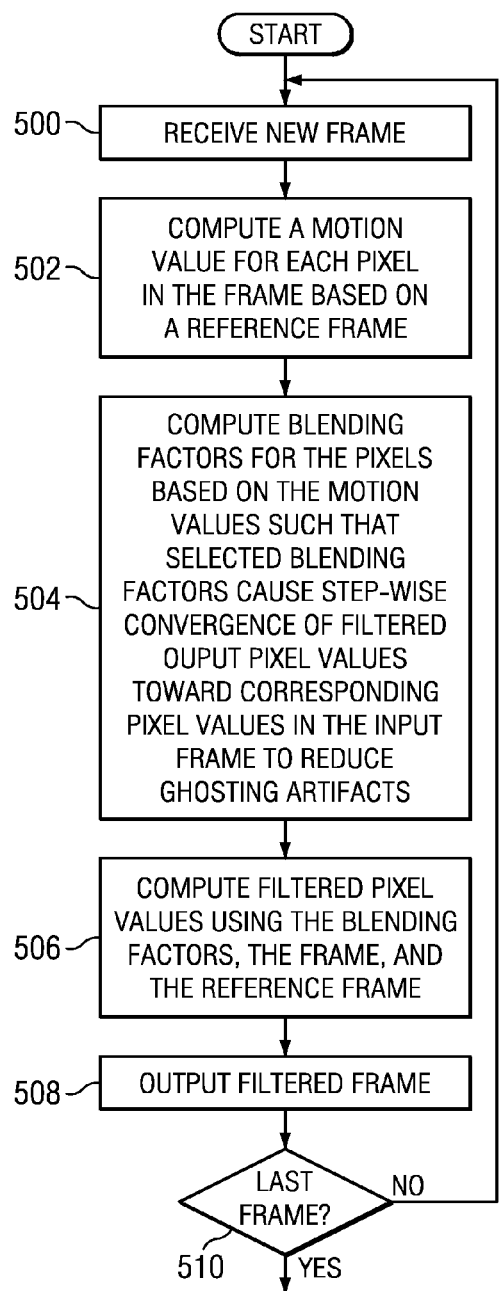

FIG. 5 is a flow graph of a method for ghosting artifact reduction in a temporal noise filter in accordance with one or more embodiments of the invention. As shown in FIG. 5, the method is applied to frames in a video sequence. Steps 500 and 502 are the same as steps 300-302 of FIG. 3. Once the motion values are computed, blending factors are computed for the pixels such that selected blending factors $a(x,y,n)$ cause step-wise convergence of filtered output pixel values computed using the blending factors toward the corresponding pixel values in the current frame (506). This convergence has the effect of reducing ghosting artifacts. More specifically, a blending factor is computed as $a_0+(1-a_0)m(x,y,n)/T_m$ unless the condition $|a(x,y,n)(Y_c(x,y,n)-Y_o(x,y,n-1))|<\frac{1}{2}$ or $|a(x,y,n)(U_c(x,y,n)-U_o(x,y,n-1))|<\frac{1}{2}$ or $|a(x,y,n)(V_c(x,y,n)-V_o(x,y,n-1))|<\frac{1}{2}$ could occur. If the condition could occur, the blending factor is computed as one (1) if $m(x,y,n)>=T_m$ or is equal to zero (0) and is computed as $3/(2*m(x,y,n))$ otherwise to compensate for the condition. The effect of a blending factor computed to compensate for the condition is that the resulting filtered output pixel value is closer to the input pixel value by 1 than it would have been had the blending factor been computed as $a_0+(1-a_0)m(x,y,n)/T_m$. In some embodiments of the invention, computation of the blending factor is a table lookup using the motion value as an index. Pseudo code illustrating creation of such a table is shown in Table 4.

Filtered pixel values are then computed using the blending factors, the frame, and the reference frame (508). The filtered pixel values are computed as described above in reference to step 308 of FIG. 3. The resulting filtered frame is then output (508). If the last frame in the video sequence has been processed (510), the method ends. Otherwise, next frame is processed.

Figure 6:
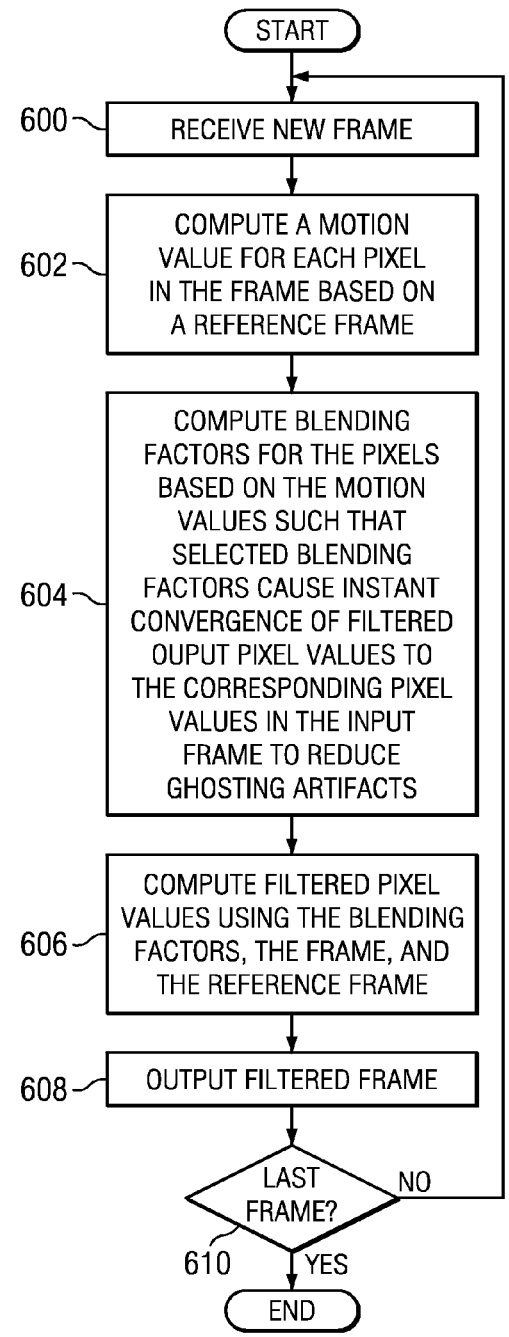

FIG. 6 a flow graph of a method for ghosting artifact reduction in a temporal noise filter in accordance with one or more embodiments of the invention. As shown in FIG. 6, the method is applied to frames in a video sequence. Steps 500 and 502 are the same as steps 300-302 of FIG. 3. Once the motion values are computed, blending factors are computed for the pixels such that selected blending factors $a(x,y,n)$ cause instant convergence of filtered output pixel values computed using the blending factors to the corresponding pixel values in the current frame (606). This convergence has the effect of reducing ghosting artifacts. More specifically, a blending factor is computed as $a_0+(1-a_0)m(x,y,n)/T_m$ unless the condition $|a(x,y,n)(Y_c(x,y,n)-Y_o(x,y,n-1))|<\frac{1}{2}$ or $|a(x,y,n)(U_c(x,y,n)-U_o(x,y,n-1))|<\frac{1}{2}$ or $|a(x,y,n)(V_c(x,y,n)-V_o(x,y,n-1))|<\frac{1}{2}$ could occur. If the condition could occur, the blending factor is computed as one (1) to compensate for the condition. The effect of a blending factor computed to compensate for the condition is that the resulting filtered output pixel value is equal to the corresponding pixel value in the current frame. In some embodiments of the invention, computation of the blending factor is a table lookup using the motion value as an index. Pseudo code illustrating creation of such a table is shown in Table 5.

Filtered pixel values are then computed using the blending factors, the frame, and the reference frame (608). The filtered pixel values are computed as described above in reference to step 308 of FIG. 3. The resulting filtered frame is then output (508). If the last frame in the video sequence has been processed (510), the method ends. Otherwise, next frame is processed.

Embodiments of the methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing including embodiments of the methods for temporal noise filtering with ghosting artifact reduction described herein. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

Embodiments of the methods described herein may be implemented in hardware, software, firmware, or any combination thereof. If implemented at least partially in software, the software may be executed in one or more processors, such as a microprocessor, application specific integrated circuit (ASIC), field programmable gate array (FPGA), or digital signal processor (DSP). The software embodying the methods may be initially stored in a computer-readable medium (e.g., memory, flash memory, a DVD, etc.) and loaded and executed by a processor. Further, the computer-readable medium may be accessed over a network or other communication path for downloading the software. In some cases, the software may also be provided in a computer program product, which includes the computer-readable medium and packaging materials for the computer-readable medium.

Figure 9:
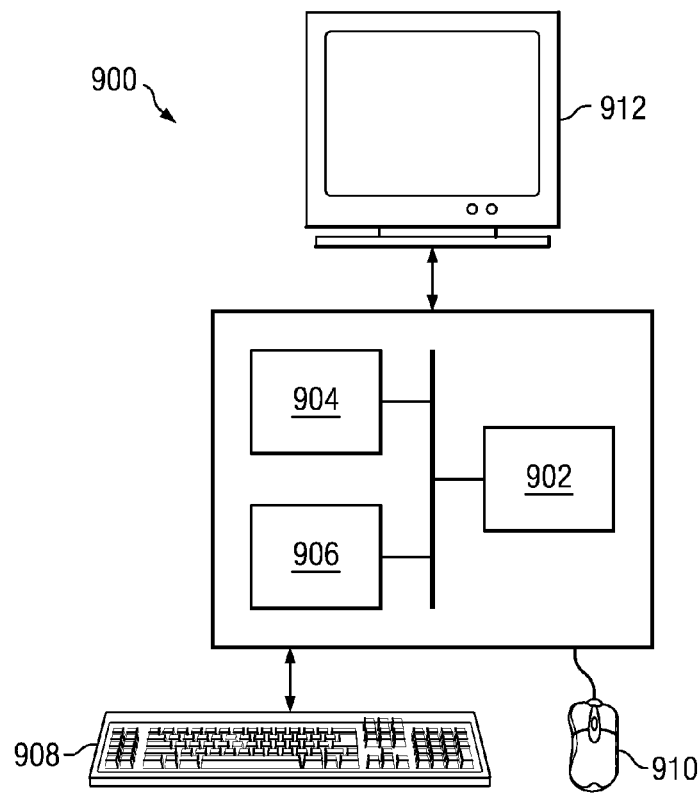
FIGS. 7-9 show illustrative digital systems in accordance with one or more embodiments of the invention.
Figure 7:
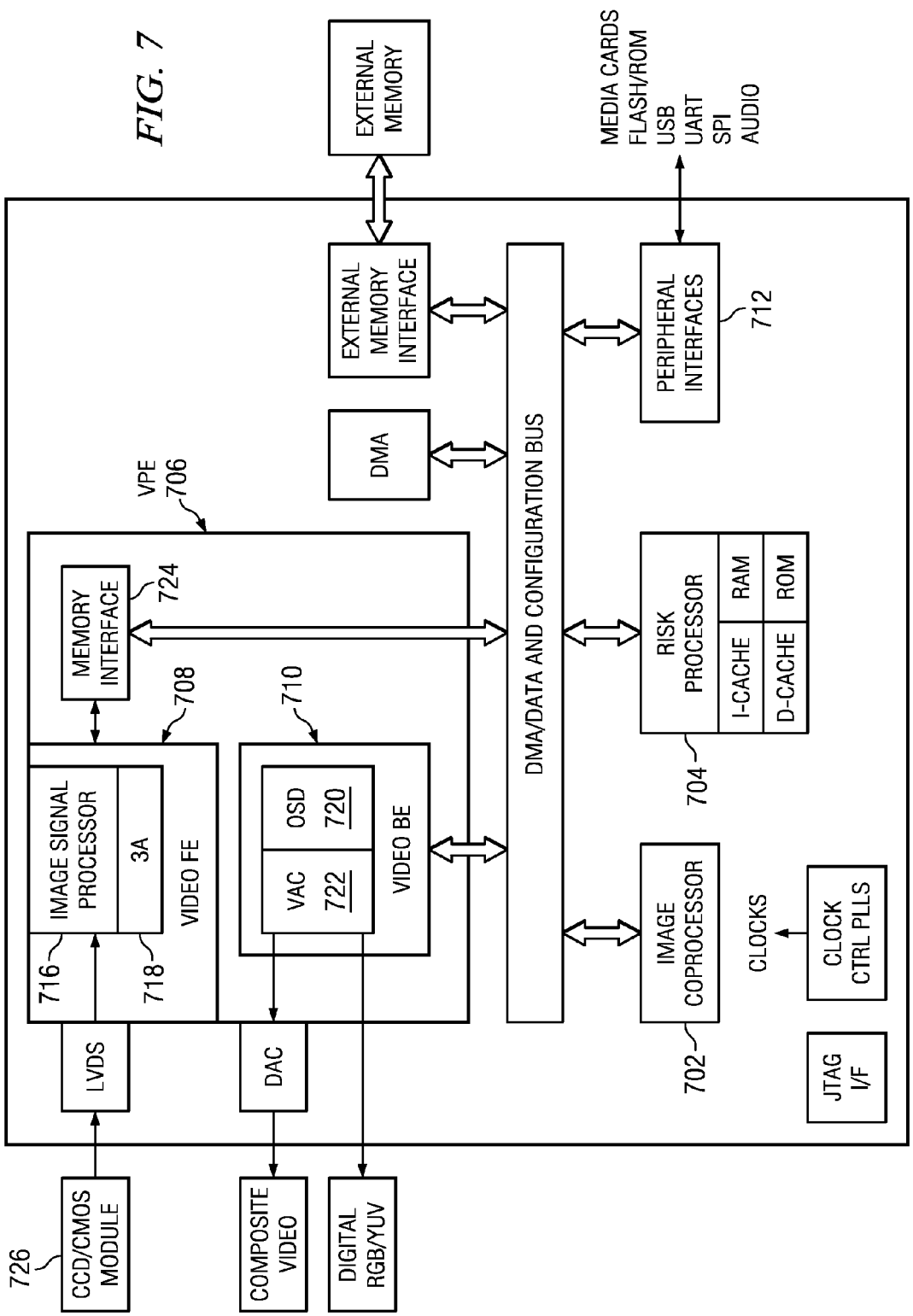
Figure 8:
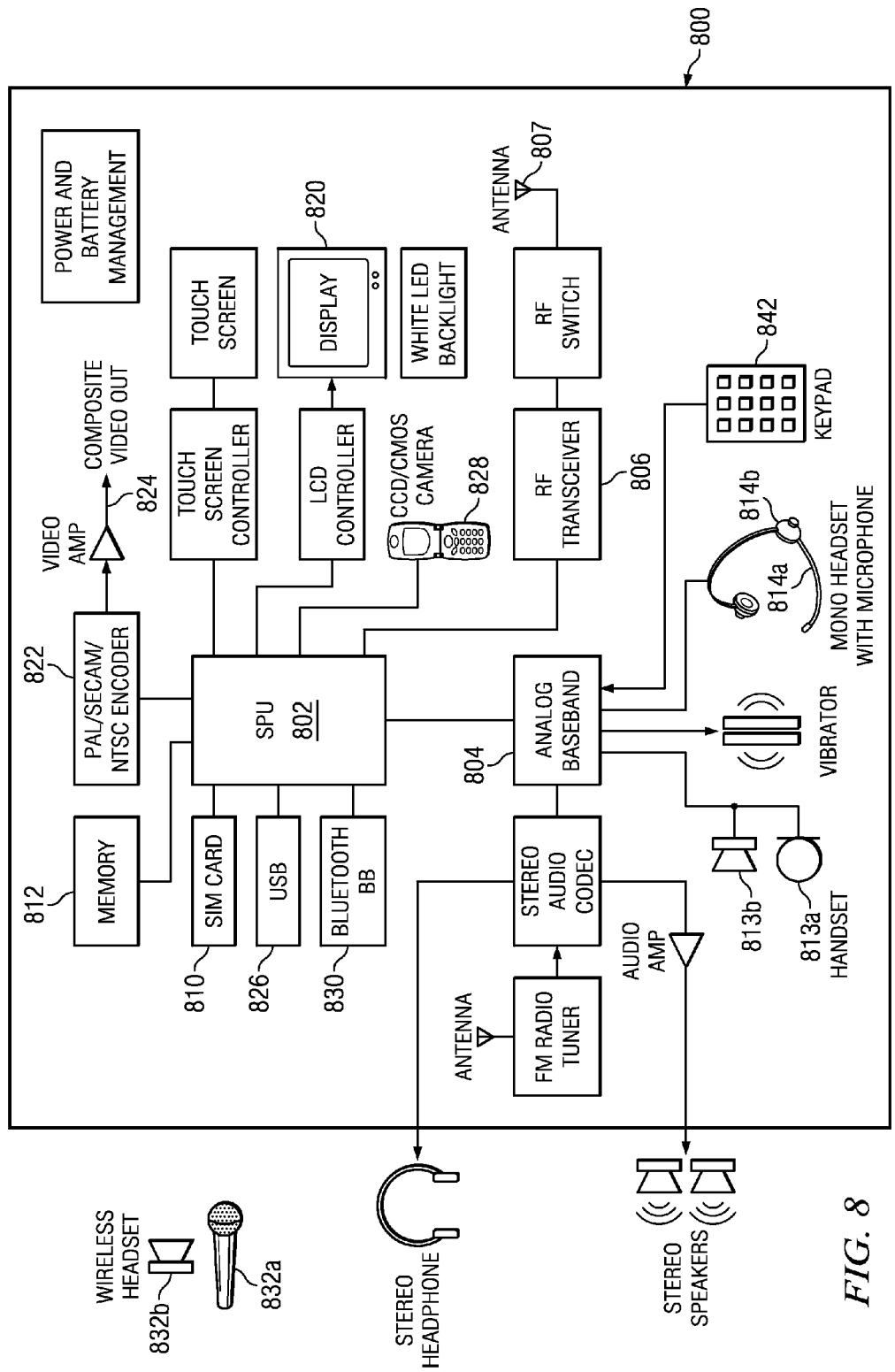

Embodiments of the methods and systems for ghosting artifact reduction in temporal noise filtering as described herein may be implemented for virtually any type of digital system (e.g., a desk top computer, a laptop computer, a hand-held device such as a mobile (i.e., cellular) phone, a personal digital assistant, a digital camera, a digital video recorder, etc.) with functionality to capture or otherwise generate digital video sequences or to display digital video sequences. FIGS. 7-9 show block diagrams of illustrative digital systems.

FIG. 7 shows a digital system suitable for an embedded system (e.g., a digital camera) in accordance with one or more embodiments of the invention that includes, among other components, a DSP-based image coprocessor (ICP) (702), a RISC processor (704), and a video processing engine (VPE) (706) that may be configured to perform embodiments of methods described herein. The RISC processor (704) may be any suitably configured RISC processor. The VPE (706) includes a configurable video processing front-end (Video FE) (708) input interface used for video capture from imaging peripherals such as image sensors, video decoders, etc., a configurable video processing back-end (Video BE) (710) output interface used for display devices such as SDTV displays, digital LCD panels, HDTV video encoders, etc, and memory interface (724) shared by the Video FE (708) and the Video BE (710). The digital system also includes peripheral interfaces (712) for various peripherals that may include a multi-media card, an audio serial port, a Universal Serial Bus (USB) controller, a serial port interface, etc.

The Video FE (708) includes an image signal processor (ISP) (716), and a 3A statistic generator (3A) (718). The ISP (716) provides an interface to image sensors and digital video sources. More specifically, the ISP (716) may accept raw image/video data from a sensor module (726) (e.g., CMOS or CCD) and can accept YUV video data in numerous formats. The ISP (716) also includes a parameterized image processing module with functionality to generate image data in a color format (e.g., RGB) from raw CCD/CMOS data. The ISP (716) is customizable for each sensor type and supports video frame rates for preview displays of captured digital images and for video recording modes. The ISP (716) also includes, among other functionality, an image resizer, statistics collection functionality, and a boundary signal calculator. The 3A module (718) includes functionality to support control loops for auto focus, auto white balance, and auto exposure by collecting metrics on the raw image data from the ISP (716) or external memory. In one or more embodiments of the invention, the Video FE (708) is configured to perform temporal noise filtering with ghosting artifact reduction as described herein.

The Video BE (710) includes an on-screen display engine (OSD) (720) and a video analog encoder (VAC) (722). The OSD engine (720) includes functionality to manage display data in various formats for several different types of hardware display windows and it also handles gathering and blending of video data and display/bitmap data into a single display window before providing the data to the VAC (722) in a color space format (e.g., RGB, YUV, YCbCr). The VAC (722) includes functionality to take the display frame from the OSD engine (720) and format it into the desired output format and output signals required to interface to display devices. The VAC (722) may interface to composite NTSC/PAL video devices, S-Video devices, digital LCD devices, high-definition video encoders, DVI/HDMI devices, etc.

The memory interface (724) functions as the primary source and sink to modules in the Video FE (708) and the Video BE (710) that are requesting and/or transferring data to/from external memory. The memory interface (724) includes read and write buffers and arbitration logic.

The ICP (702) includes functionality to perform the computational operations required for compression and other processing of captured images. The video compression standards supported may include, for example, one or more of the JPEG standards, the MPEG standards, and the H.26x standards. In one or more embodiments of the invention, the ICP (702) may be configured to perform computational operations of a temporal noise filtering method as described herein.

In operation, to capture a photograph or video sequence, video signals are received by the video FE (708) and converted to the input format needed to perform video compression. Prior to the compression, temporal noise filtering with ghosting artifact reduction as described herein may be applied as part of processing the captured video data. The video data generated by the video FE (708) is stored in the external memory. The video data is then encoded, i.e., compressed. During the compression process, the video data is read from the external memory and the compression computations on this video data are performed by the ICP (702). The resulting compressed video data is stored in the external memory. The compressed video data is then read from the external memory, decoded, and post-processed by the video BE (710) to display the image/video sequence.

FIG. 8 is a block diagram of a digital system (e.g., a mobile cellular telephone) (800) that may be configured to perform temporal noise filtering with ghosting artifact reduction as described herein. The signal processing unit (SPU) (802) includes a digital signal processing system (DSP) that includes embedded memory and security features. The analog baseband unit (804) receives a voice data stream from the handset microphone (813a) and sends a voice data stream to the handset mono speaker (813b). The analog baseband unit (804) also receives a voice data stream from the microphone (814a) and sends a voice data stream to the mono headset (814b). The analog baseband unit (804) and the SPU (802)

may be separate ICs. In many embodiments, the analog baseband unit (804) does not embed a programmable processor core, but performs processing based on configuration of audio paths, filters, gains, etc being setup by software running on the SPU (802). The display (820) may also display pictures and video streams received from the network, from a local camera (828), or from other sources such as the USB (826) or the memory (812). The SPU (802) may also send a video stream to the display (820) that is received from various sources such as the cellular network via the RF transceiver (806) or the camera (828). The SPU (802) may also send a video stream to an external video display unit via the encoder (822) over a composite output terminal (824). The encoder unit (822) may provide encoding according to PAL/SECAM/NTSC video standards.

The SPU (802) includes functionality to perform the computational operations required for video encoding and decoding. The video encoding standards supported may include, for example, one or more of the JPEG standards, the MPEG standards, and the H.26x standards. In one or more embodiments of the invention, the SPU (802) is configured to perform computational operations of a method of temporal noise filtering with ghosting artifact reduction as described herein. Software instructions implementing the method(s) may be stored in the memory (812) and executed by the SPU (802) as part of capturing and/or encoding of digital image data, e.g., pictures and video streams and/or after decoding a received digital image data and prior to sending the digital image data to a display or external display unit.

FIG. 9 shows a digital system (900) (e.g., a personal computer) that includes a processor (902), associated memory (904), a storage device (906), and numerous other elements and functionalities typical of digital systems (not shown). In one or more embodiments of the invention, a digital system may include multiple processors and/or one or more of the processors may be digital signal processors. The digital system (900) may also include input means, such as a keyboard (908) and a mouse (910) (or other cursor control device), and output means, such as a monitor (912) (or other display device). The digital system (900) may be connected to a network (914) (e.g., a local area network (LAN), a wide area network (WAN) such as the Internet, a cellular network, any other similar type of network and/or any combination thereof) via a network interface connection (not shown). Those skilled in the art will appreciate that the input and output means may take other forms.

The digital system (900) may also include an image capture device (not shown) that includes circuitry (e.g., optics, a sensor, readout electronics) for capturing video sequences. The digital system (900) may include functionality to perform temporal noise filtering with ghosting artifact reduction as described herein on the captured video sequences. The digital system (900) may also include functionality to decode encoded video sequences, perform temporal noise filtering with ghosting artifact reduction as described herein on the decoded video sequences, and display the filtered decoded sequences on the monitor (912). The encoded video sequences may be received via the network, may be read from storage media (e.g., a DVD), etc.

Further, those skilled in the art will appreciate that one or more elements of the aforementioned digital system (900) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. For example, although FIG. 1 illustrates noise filtering in accordance with methods described herein prior to encoding a video sequence, one of ordinary skill in the art will understand embodiments of the invention in which such noise filtering is used in other places. For example, noise filtering as described herein may be applied after decoding an encoded video sequence, e.g., between the video decoder (114) and the display (116) of FIG. 1. As another example, in a digital system that includes a DVD player, a noise filter as described herein may be applied after the video on the DVD is decoded and before it is displayed on the television or computer screen. Accordingly, the scope of the invention should be limited only by the attached claims. It is therefore contemplated that the appended claims will cover any such modifications of the embodiments as fall within the true scope and spirit of the invention.

What is claimed is:

1. A method of noise filtering of a digital video sequence to reduce ghosting artifacts, the method comprising:
   computing motion values for pixels in a frame of the digital video sequence based on a reference frame;
   computing blending factors for the pixels based on the motion values;
   generating filtered output pixel values by applying the blending factors to corresponding pixel values in the reference frame and the frame, wherein selected filtered output pixel values are converged toward corresponding pixel values in the frame to reduce ghosting artifacts, wherein generating filtered output pixel values comprises incrementing or decrementing a filtered output pixel value by 1 to move the filtered output pixel value closer to a corresponding pixel value in the frame when the filtered output pixel value is equal to a corresponding pixel value in the reference frame; and
   outputting the filtered frame.

2. The method of claim 1, wherein the selected filtered output pixel values are instantly converged toward the corresponding pixel values in the frame.

3. The method of claim 1, wherein the selected filtered output pixel values are step-wise converged toward the corresponding pixel values in the frame.

4. The method of claim 1, wherein generating filtered output pixel values comprises:
   replacing a filtered output pixel value with a corresponding pixel value in the frame when the filtered output pixel value is equal to a corresponding pixel value in the reference frame.

5. The method of claim 1, wherein computing blending factors comprises:
   computing a blending factor as $a_0+(1-a_0)m(x,y,n)/T_m$ when $(2\ (a_0+(1-a_0)\ m(x,y,n)/T_m)m(x,y,n)>=3)$;
   computing a blending factor as 1 when $m(x,y,n)=T_m$ or $m(x,y,n)=0$; and
   computing a blending factor as $3/(2*(x,y,n))$ otherwise,
   wherein n is a number of the frame, x and y are pixel coordinates, $m(x,y,n)$ is a motion value, $T_m$ is a motion threshold, and $a_0$ is a strength parameter.

6. The method of claim 1, wherein computing blending factors comprises:
computing a blending factor as $a_0+(1-a_0)m(x,y,n)/T_m$ when $(2(a_0+(1-a_0)m(x,y,n)/T_m)m(x,y,n)>=3)$ and $m(x,y,n)<T_m$; and
computing a blending factor as 1 otherwise,
wherein n is a number of the frame, x and y are pixel coordinates, $m(x,y,n)$ is a motion value, $T_m$ is a motion threshold, and $a_0$ is a strength parameter.

7. The method of claim 1, further comprising:
applying a spatial filter to the frame prior to computing the motion values.

8. A noise filter for filtering a digital video sequence to reduce ghosting artifacts, the noise filter comprising:
a frame buffer component configured to store an output frame of the noise filter to be used as a reference frame;
a motion detection component configured to compute motion values for pixels in a frame of the digital video sequence based on the reference frame;
a motion-to-blending factor conversion component configured to compute blending factors for the pixels based on the motion values; and
a frame blending component configured to generate filtered output pixel values by applying the blending factors to corresponding pixel values in the reference frame and the frame, wherein selected filtered output pixel values are converged toward corresponding pixel values in the frame to reduce ghosting artifacts; wherein the frame blending component is configured to perform one selected from a group consisting of incrementing or decrementing a filtered output pixel value by 1 to move the filtered output pixel value closer to a corresponding pixel value in the frame when the filtered output pixel value is equal to a corresponding pixel value in the reference frame, and replacing a filtered output pixel value with a corresponding pixel value in the frame when the filtered output pixel value is equal to a corresponding pixel value in the reference frame.

9. The noise filter of claim 8, wherein the selected filtered output pixel values are instantly converged toward the corresponding pixel values in the frame.

10. The noise filter of claim 8, wherein the selected filtered output pixel values are step-wise converged toward the corresponding pixel values in the frame.

11. The noise filter of claim 8, wherein the motion-to-blending factor conversion component is configured to:
compute a blending factor as $a_0+(1-a_0)m(x,y,n)/T_m$ when $(2(a_0+(1-a_0)m(x,y,n)/T_m)m(x,y,n)>=3)$;
compute a blending factor as 1 when $m(x,y,n)=T_m$ or $m(x,y,n)=0$; and
compute a blending factor as $3/(2*(x,y,n))$ otherwise,
wherein n is a number of the frame, x and y are pixel coordinates, $m(x,y,n)$ is a motion value, $T_m$ is a motion threshold, and $a_0$ is a strength parameter.

12. The noise filter of claim 8, wherein the motion-to-blending factor conversion component is configured to:
compute a blending factor as $a_0+(1-a_0)m(x,y,n)/T_m$ when $(2(a_0+(1-a_0)m(x,y,n)/T_m)m(x,y,n)>=3)$ and $m(x,y,n)<T_m$; and
compute a blending factor as 1 otherwise,
wherein n is a number of the frame, x and y are pixel coordinates, $m(x,y,n)$ is a motion value, $T_m$ is a motion threshold, and $a_0$ is a strength parameter.

13. The noise filter of claim 8, further comprising:
a spatial filter component configured to apply a spatial filter to the frame.

14. A digital system configured to filter a digital video sequence to reduce ghosting artifacts, the digital system comprising:
means for storing a filtered output frame to be used as a reference frame; and
means for computing motion values for pixels in a frame of the digital video sequence based on the reference frame;
means for computing blending factors for the pixels based on the motion values; and
means for generating filtered output pixel values by applying the blending factors to corresponding pixel values in the reference frame and the frame, wherein selected filtered output pixel values are converged toward corresponding pixel values in the frame to reduce ghosting artifacts; wherein the means for generating filtered output pixel values performs one selected from a group consisting of incrementing or decrementinq a filtered output pixel value by 1 to move the filtered output pixel value closer to a corresponding pixel value in the frame when the filtered output pixel value is equal to a corresponding pixel value in the reference frame, and replacing a filtered output pixel value with a corresponding pixel value in the frame when the filtered output pixel value is equal to a corresponding pixel value in the reference frame.

15. The digital system of claim 14, wherein the means for computing blending factors:
computes a blending factor as $a_0+(1-a_0)m(x,y,n)/T_m$ when $(2(a_0+(1-a_0)m(x,y,n)/T_m)m(x,y,n)>=3)$;
computes a blending factor as 1 when $m(x,y,n)=T_m$ or $m(x,y,n)=0$; and
computes a blending factor as $3/(2*(x,y,n))$ otherwise,
wherein n is a number of the frame, x and y are pixel coordinates, $m(x,y,n)$ is a motion value, $T_m$ is a motion threshold, and $a_0$ is a strength parameter.

16. The digital system of claim 14, wherein the means for computing blending factors:
computes a blending factor as $a_0+(1-a_0)m(x,y,n)/T_m$ when $(2(a_0+(1-a_0)m(x,y,n)/T_m)m(x,y,n)>=3)$ and $m(x,y,n)<T_m$; and
computes a blending factor as 1 otherwise,
wherein n is a number of the frame, x and y are pixel coordinates, $m(x,y,n)$ is a motion value, $T_m$ is a motion threshold, and $a_0$ is a strength parameter.

17. The digital system of claim 14, further comprising:
means for applying a spatial filter to the frame.

* * * * *